United States Patent
Han et al.

[11] Patent Number: 6,079,017
[45] Date of Patent: Jun. 20, 2000

[54] METHOD FOR LOADING SUB-PROCESSOR IN SYSTEM HAVING A PLURALITY OF SUB-PROCESSORS WITH RESPECT TO MAIN PROCESSOR

[75] Inventors: Hyo-Chan Han, Inchon-si; Ki-Beom Kim; Tae-Hoon Kim, both of Seoul, all of Rep. of Korea

[73] Assignee: Hyundai Electronics Ind. Co., Ltd., Kyoungki-do, Rep. of Korea

[21] Appl. No.: 08/982,572

[22] Filed: Dec. 2, 1997

[30] Foreign Application Priority Data

Dec. 2, 1996 [KR] Rep. of Korea ............... 96-60981
Oct. 27, 1997 [KR] Rep. of Korea ............... 97-55349

[51] Int. Cl.[7] .................................................. G06F 15/177
[52] U.S. Cl. .......................... 713/2; 714/51; 709/211
[58] Field of Search .................. 712/31, 28, 29, 712/30; 710/112; 395/200.72, 800.29, 800; 340/825.54; 370/412; 364/230.4; 709/224, 208, 211; 713/1, 2; 714/51

[56] References Cited

U.S. PATENT DOCUMENTS

| | | | |
|---|---|---|---|
| 4,818,984 | 4/1989 | Chang et al. ................ | 340/825.54 |
| 5,117,424 | 5/1992 | Cohen et al. ................ | 370/508 |
| 5,187,794 | 2/1993 | Hall .......................... | 364/187 |
| 5,406,199 | 4/1995 | Shah .......................... | 324/158.1 |
| 5,410,651 | 4/1995 | Sekizawa et al. ............ | 709/224 |
| 5,590,284 | 12/1996 | Crosetto .................... | 395/800.29 |
| 5,615,213 | 3/1997 | Griefer ...................... | 370/412 |
| 5,768,531 | 6/1998 | Lin .......................... | 395/200.72 |
| 5,805,839 | 9/1998 | Singhal ...................... | 710/112 |

*Primary Examiner*—Richard L. Ellis
*Attorney, Agent, or Firm*—McAulay Nissen Goldberg Kiel, LLP

[57] ABSTRACT

A method for loading sub-processors in system having a plurality of sub-processors connected with main processor via a repeater and utilizing broadcasting function is disclosed. The method comprises the Steps of inspecting a transfer path communicating the main processor and the plural sub-processors; collecting a loading request signal transmitted from the sub-processors at predetermined time period; and loading simultaneously the sub-processors using broadcasting function after interconnecting the sub-processors which request the collected loading during the collecting Step with the main processor via the repeater in multipoint base. The sub-processors having the collected signal are simultaneously loaded using broadcasting function, it has the effect for reducing loading time.

18 Claims, 10 Drawing Sheets

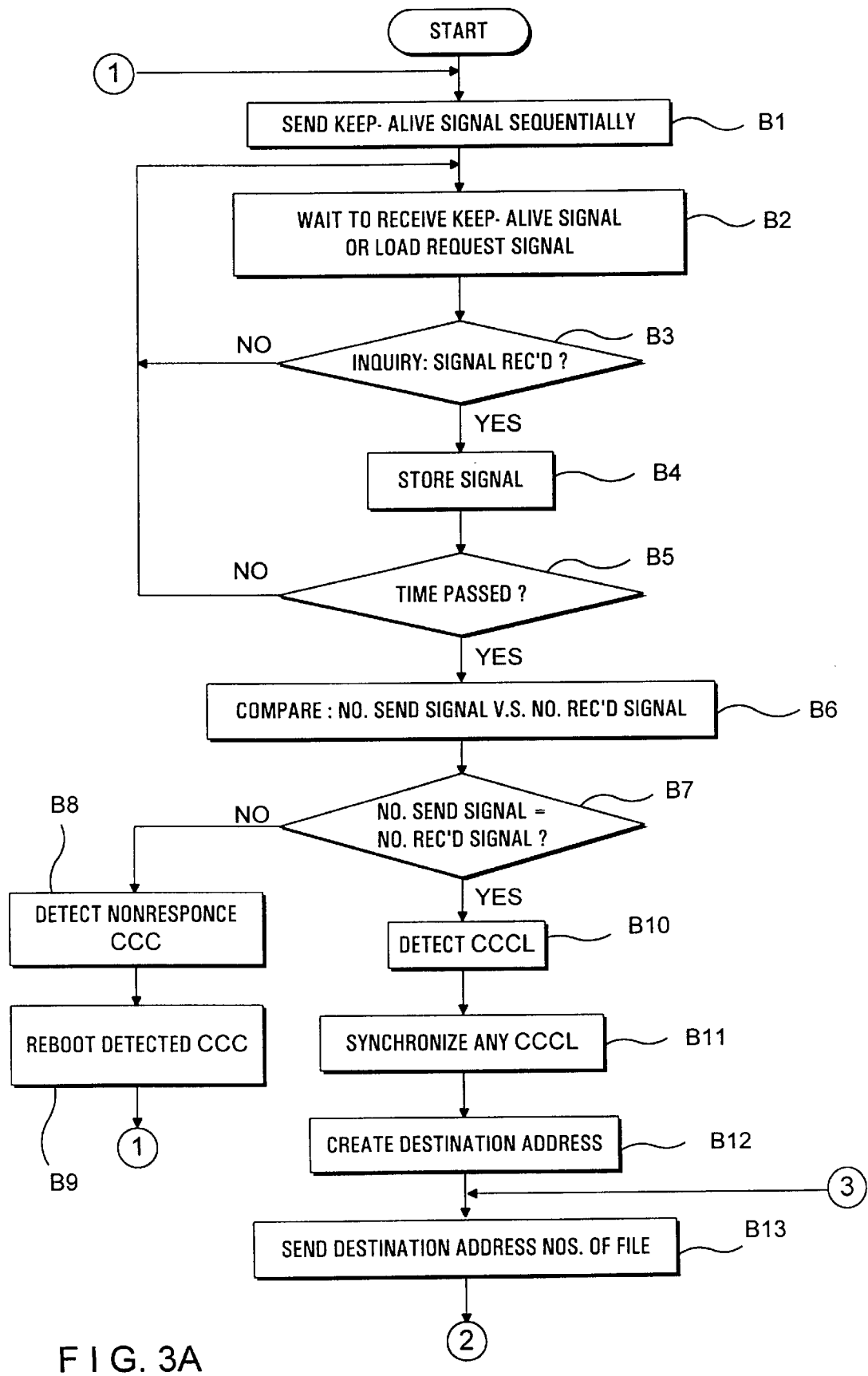
F I G. 3A

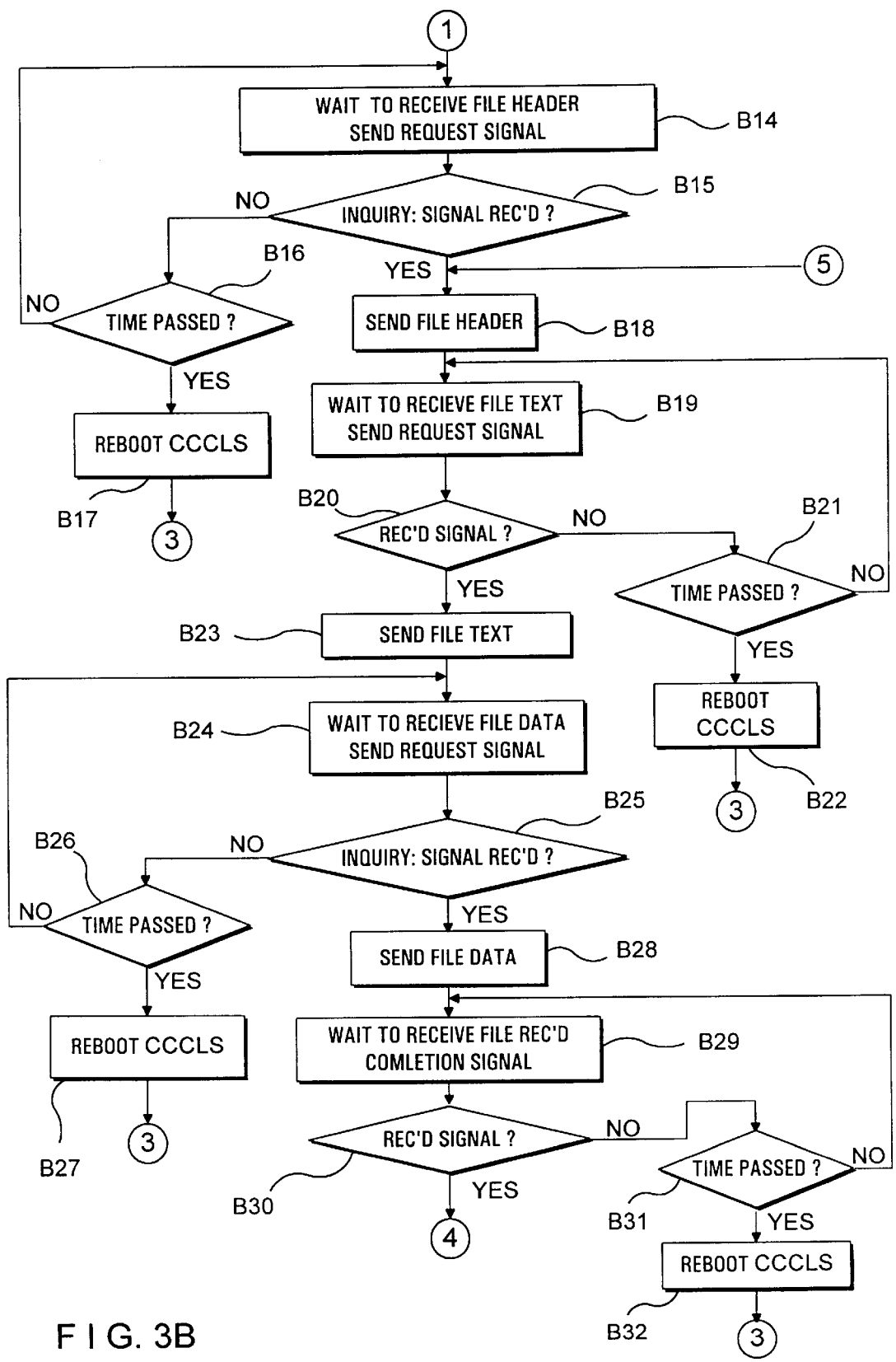
F I G. 3B

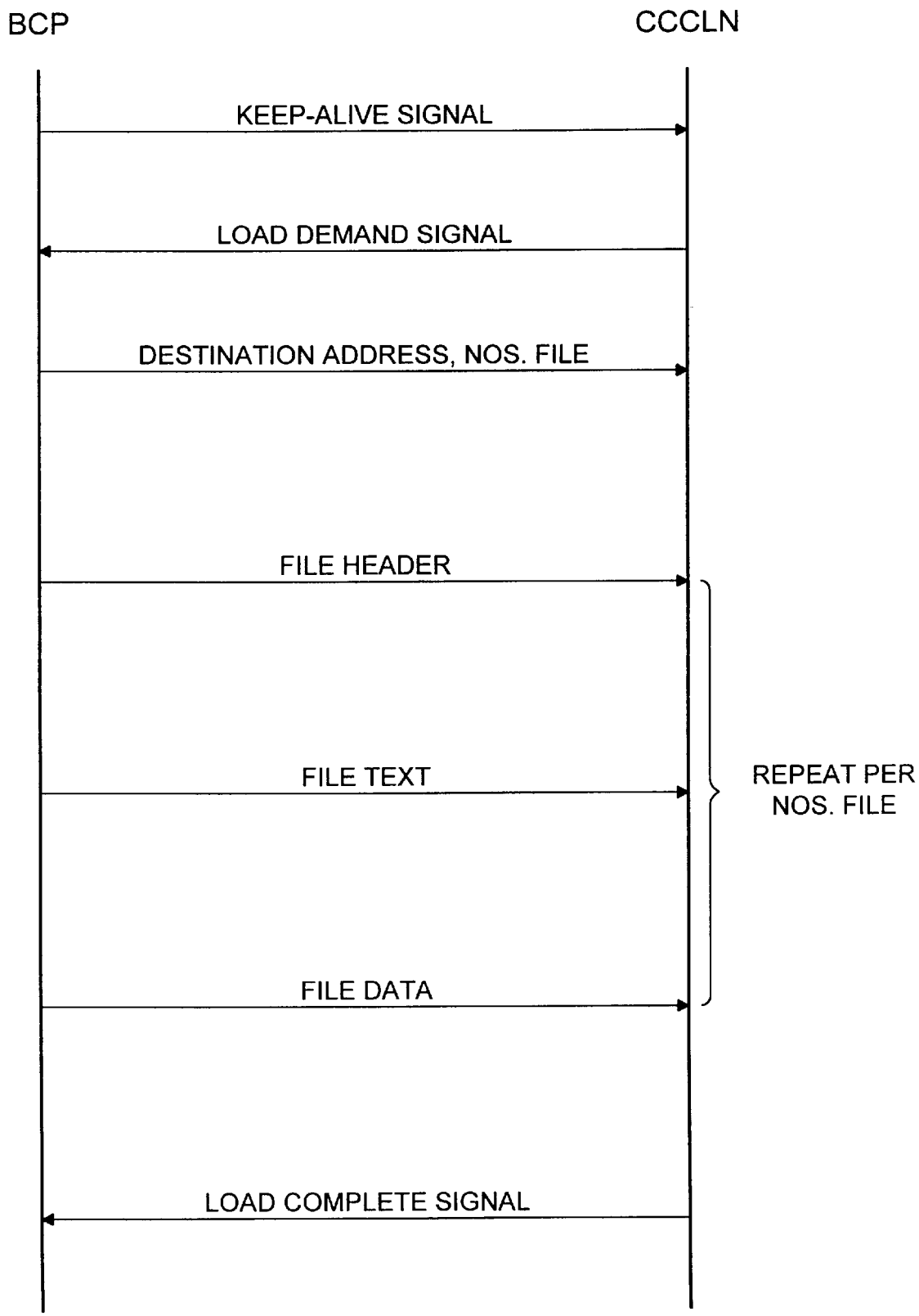
F I G. 7

METHOD FOR LOADING SUB-PROCESSOR IN SYSTEM HAVING A PLURALITY OF SUB-PROCESSORS WITH RESPECT TO MAIN PROCESSOR

BACKGROUND OF THE INVENTION

1. Field of the Invention

The present invention relates to a method for loading sub-processor of system in which a plurality of sub-processors serve as low-level processors with respect to the main processor. More particularly, the present invention relates to a loading procedure for loading plural sub-processors, concurrently, when utilizing broadcasting function.

2. Description of the Prior Art

Typically, in a system comprising a main processor and a plurality of sub-processors, the main processor and a plurality of sub-processors are interconnected via a repeater. FIG. 1 illustrates a conventional system in which main processor 1 and plural sub-processors 3 having N numbers are interconnected via a repeater 3. The repeater 3 is comprised of a numbers of N nodes connecting each to the corresponding sub-processors 3 having N numbers and a node connected to the main processor. The repeater 3 functions as a transmitter for sending data of a main processor to a link sub-processor.

That is, when a transmission path is demanded for inter-communicating the main processor with the link sub-processor, for instance, when data is transmitted between the main processor 1 and the sub-processor 3, or a loading procedure of a sub-processor is demanded with respect to a main processor, each node in the repeater is interconnected to provide a transmission path.

In the system when request of loading procedure with respect to the sub-processor occurs each sub-processor is loaded by control signal or a program running machine code in file, so main processor is interconnected to a sub-processor via the repeater 2. When plural sub-processors are loaded concurrently, the above mentioned procedure is repeated with respect to each sub-processor to enable all sub-processors to be loaded.

On the other hand, a broadcasting function means that the same data is transmitted concurrently to plural sub-processors from a main processor. At this time, the repeater 2 is interconnected between the main processor 1 and all the corresponding sub-processors 3. When broadcasting function is executed to all the N numbers sub-processors, for instance, a node of the main processor is common-connected to the a numbers of N nodes of the sub-processors as illustrated by a dotted line in FIG. 1, and thus the same data is transmitted to all the sub-processors comprising N numbers.

As in the system that plural sub-processors exist as a lower level processor with respect to the main processor, cable television network, various computer network and cable/radio communication network, etc. all exist. The radio communication network typically includes Code Division Multiple Access (CDMA) system, Time Division Multiple Access (TDMA) system, and Frequency Division Multiple Access (FDMA) system.

In CDMA system, Basestation Control Processor (BCP) is employed as a main processor, High capacity Inter Processor Communication Node Assembly (HINA) is employed as a repeater and Channel Card Controller (CCC) is employed as a sub-processor, which are schematically illustrated in FIG. 2.

BCP 11 stores Run Program, Operating System, and Utility Program for executing each CCC 13. When a channel card is loaded, the programs are transmitted to the corresponding CCC. Further, HINA 12 executes the function for interconnecting BCP 11 and CCC 13 in point-to-point or multipoint base, and CCC 13 downloads Run Program from BCP 11 and executes the function for running Utility Program.

In the above CDMA system, when CCC which is sub-processor is loaded, CCC 13 and BCP 11 are interconnected through HINA 12 in point-to-point base and thereafter the run program and the utility program are transmitted to CCC 13. At this time, when plural CCCs are loaded, the above procedure is repeated with respect to each CCC and all the channel cards to be loaded are loaded.

However, in such a system having plural sub-processors serving as a lower level with respect to the main processor, a conventional method for loading plural sub-processors has much request time to load the sub-processor due to that main processor which is interconnected to each sub-processor in point-to-point base and each sub-processor which is individually loaded in sequence. That is, when plural sub-processors are loaded, much time is required to repeatedly load sequentially repeatedly the same procedure with respect to each sub-processor.

SUMMARY OF THE INVENTION

Therefore, it is an object of the present invention to provide a method for loading sub-processor in system having a plurality of sub-processors with respect to main processor for solving the problems.

It is another object of the present invention to provide a method for loading sub-processor in system having a plurality of sub-processors with respect to main processor to load plural sub-processors at the same time using broadcasting function when the sub-processor is loaded.

In order to achieve the above objects of the present invention, a method for loading sub-processors in system having a plurality of sub-processors connected with main processor via a repeater and utilizing broadcasting function, the method comprises the Steps of inspecting a transfer path communicating the main processor and the plural sub-processors; collecting a loading request signal transmitted from the sub-processors at predetermined time period; and loading simultaneously the sub-processors using broadcasting function after interconnecting the sub-processors which request the collected loading during the collecting Step with the main processor via the repeater in multipoint base.

The transfer path inspection Step is that the sub-processors are sequentially interconnected with the main-processor via the repeater and a predetermined signal for inspecting the transfer path is reissued to inspect the transfer path.

The transfer path inspection Step and the collect method for the loading object collecting Step are that a task for both the transfer path inspection and the load object collection is executed by either Keep-Alive recognition signal responding at the sub-processor or loading request signal with respect to Keep-Alive signal received from the main processor.

In the main processor, a periodical execution of a task which receives the Keep-Alive signal sequentially with respect to all sub-processors under a control of the main processor, and in the sub-processor, when the Keep-Alive message is received, either a Keep-Alive recognition signal for the signal receiving completion or a signal for the load request is sent to the main processor.

The main processor of the loading Step is loaded in synchronization with any one of sub-processors which is requested to be loaded when the sub-processor is loaded using broadcasting function. The destination address is adding an address of a synchronized sub-processor to a broadcasting address.

Further, the main processor of the loading Step is comprised of: a first Step of creating a destination address for loading a file when the sub-processor is loaded using broadcasting function, sending the destination address to the sub-processor, and loading the file into the destination address; a second Step of waiting during a predetermined time period for a request signal for transmitting a file header received from a synchronized sub-processor after sending the designation address of the first Step to the sub-processor, sending the file header to all sub-processors being requested to be loaded when the request signal for transmitting a file header is received within a predetermined time period, and rebooting a synchronized sub-processor when the request signal for transmitting a file header is not received within a predetermined time period; a third Step of waiting during a predetermined time period for a request signal for transmitting a file text received from a synchronized sub-processors after sending the file header of the second Step to the sub-processor, sending the file text to all sub-processor being requested to be loaded when the request signal for transmitting a file text is received within a predetermined time period, and rebooting a synchronized sub-processor when the request signal for transmitting a file text is not received within a predetermined time period; a fourth Step of waiting during a predetermined time period for a request signal for transmitting file data received from a synchronized sub-processors after sending the file text of the third Step to the sub-processor, sending the file data to all sub-processor being requested to be loaded when the request signal for transmitting file data is received within a predetermined time period, and rebooting a synchronized sub-processor when the request signal for transmitting file data is not received within a predetermined time period; and a fifth Step of waiting during a predetermined time period for a completion signal for receiving a file received from a synchronized sub-processor after sending the file data of the fourth Step to the sub-processor, waiting for a request signal for transmitting a sequential file header when the completion signal for receiving the file at a predetermined time period, resuming an operation for receiving the sequential file until all files are completely received, and rebooting a synchronized sub-processor when the completion signal for receiving the file is not received within a predetermined time period.

Furthermore, in the main processor of the loading Step, a load completion signal received from the sub-processor being requested to be loaded is collected at a predetermined time period when all files are transmitted to all sub-processors being requested to be loaded using broadcasting function, a loading operation is undone when number of signals for a loading completion is the same as the numbers of the sub-processors being requested to be loaded, otherwise, the sub-processor is rebooted.

Further, in the sub-processor of the loading Step which is requested to be loaded, when a file is loaded from the main processor, the file is loaded in a synchronization of any one of sub-processors selected by the main processor.

BRIEF DESCRIPTION OF THE DRAWINGS

FIG. 7 is a representation of signal flow between main processor and nonsynchronous sub-processor according to the present invention.

DESCRIPTION OF THE PREFERRED EMBODIMENT

The present invention will be better clarified by describing a preferred embodiment thereof with reference to the above accompanying drawings. In this embodiment of the present invention CDMA system is described in which plural sub-processors are interconnected with respect to main processor to a repeater and moreover the broadcasting function is supported.

Figure 1:
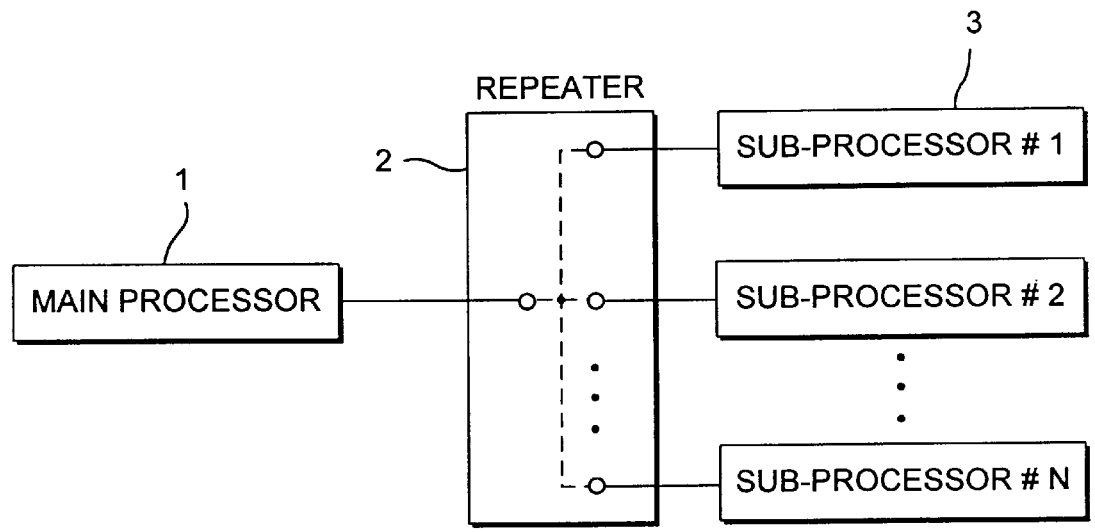
FIG. 1 is a block diagram schematically showing a system having a plurality of sub-processors with respect to a main processor.
Figure 2:
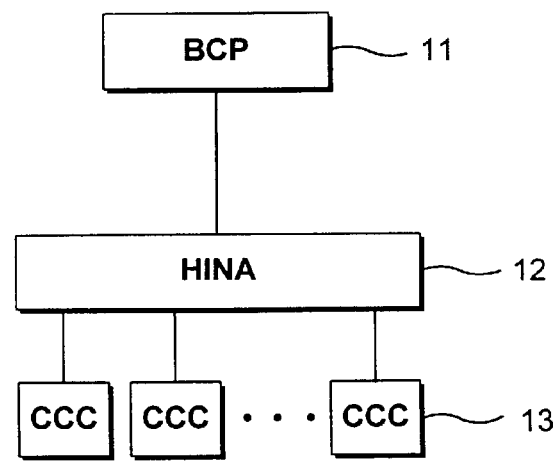
FIG. 2 is a block diagram illustrating the system having a plurality of sub-processors with respect to the main processor.

Main processor is provided with Basestation Control Processor(BCP), repeater is provided with High capacity Inter Processor Communication Node Assembly(HINA), and plural sub-processors are provided with Channel Card Controller(CCC), which are schematically illustrated in FIG. 2. Single BCP is interconnected to each CCC having approximately 170 numbers.

Figure 3C:
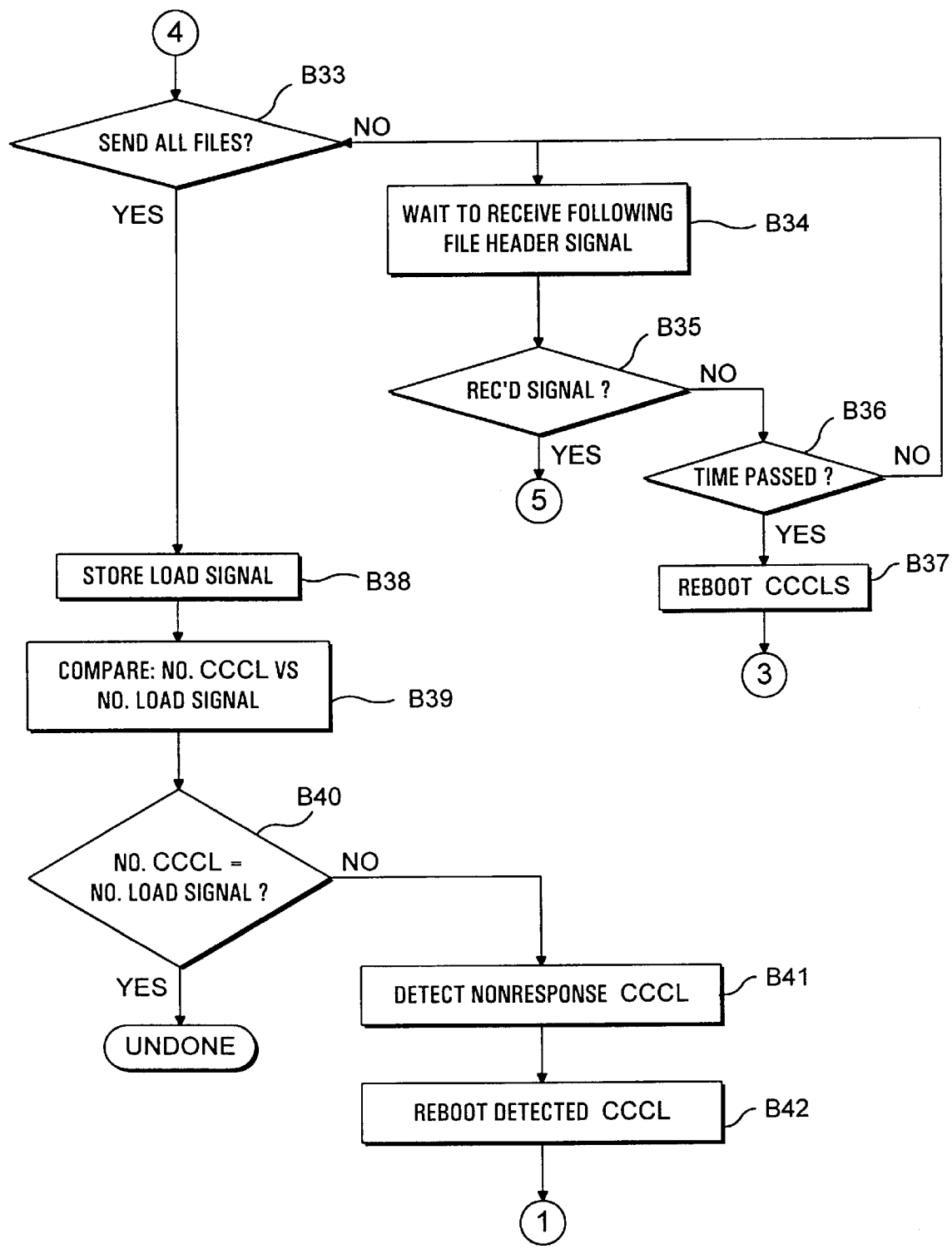
FIG. 3 is a flowchart showing operational steps of the main processor according to the present invention.
Figure 4A:
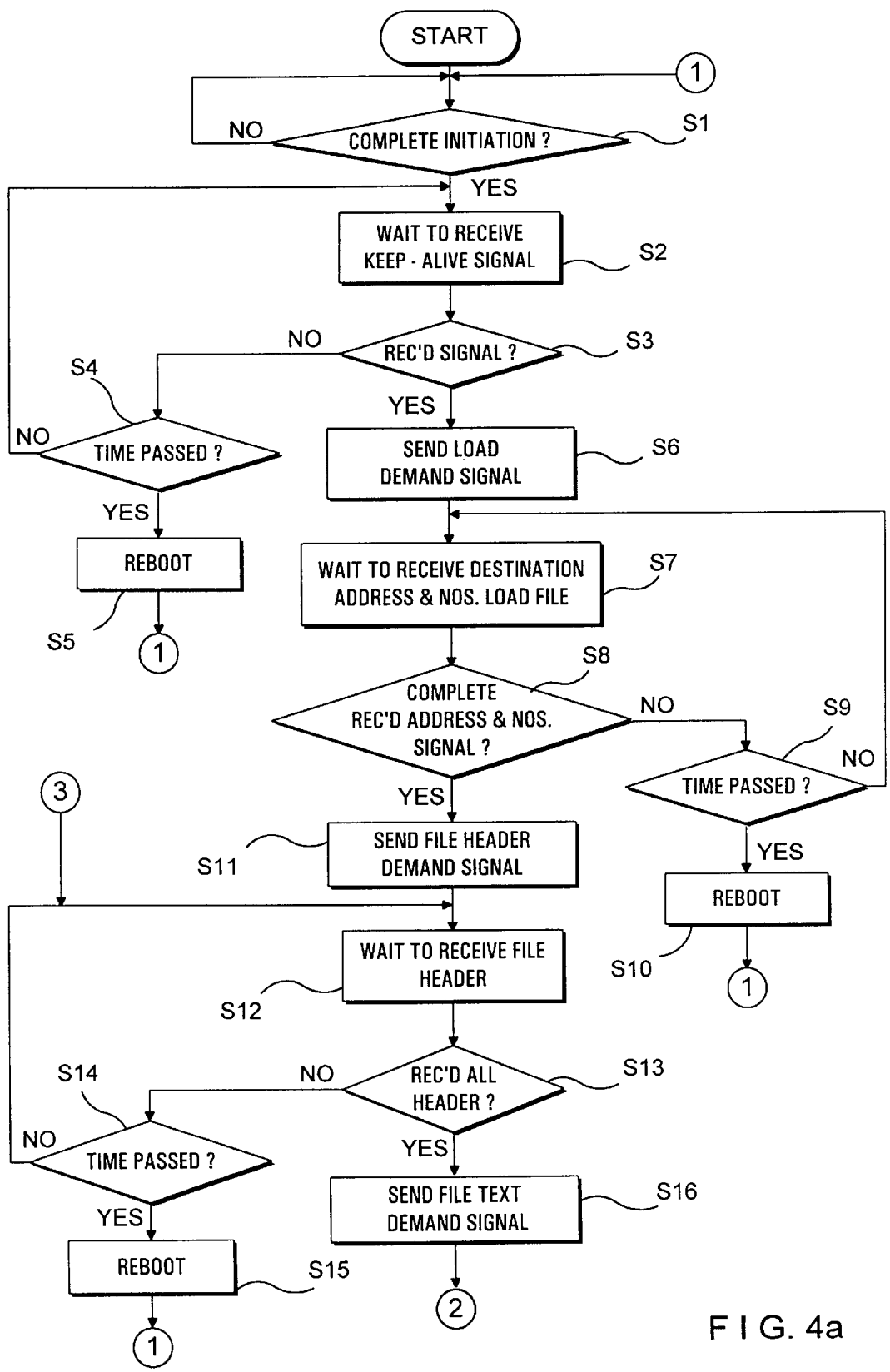
FIG. 4 is a flowchart showing operational steps of sub-processor in synchronization according to the present invention.
Figure 4B:
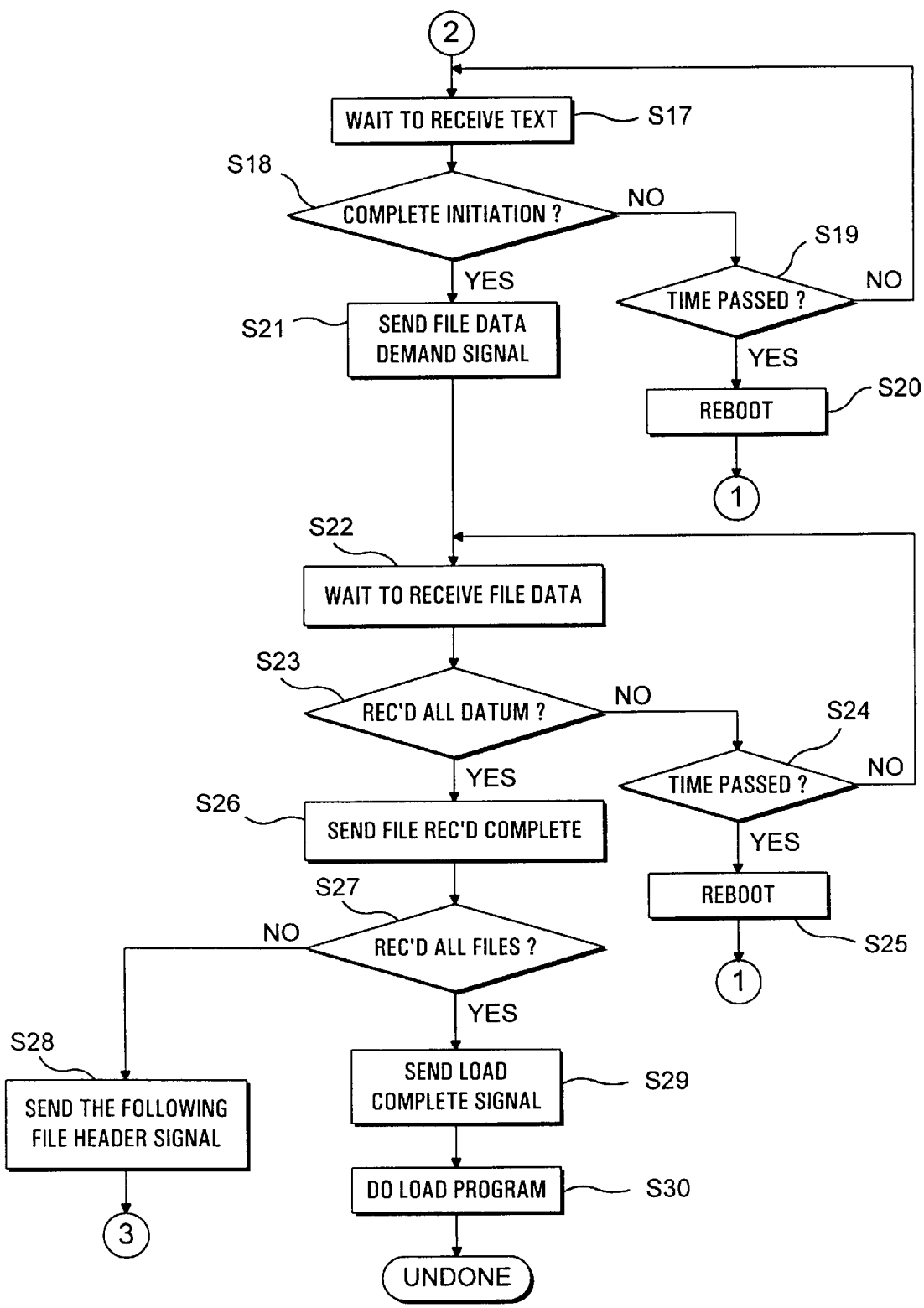
Figure 5A:
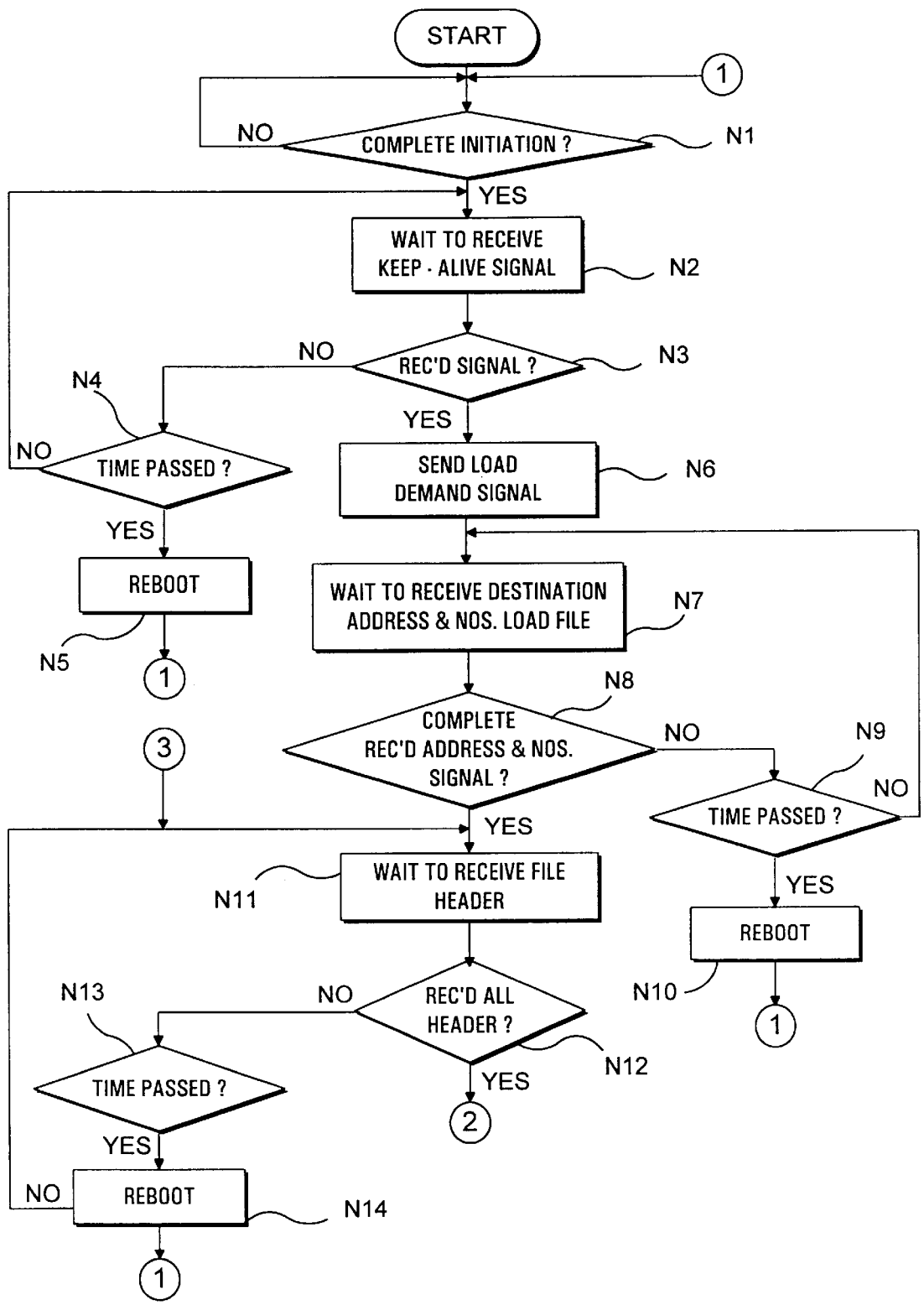
FIG. 5 is a flowchart showing operational steps of sub-processor in nonsynchronization according to the present invention.
Figure 5B:
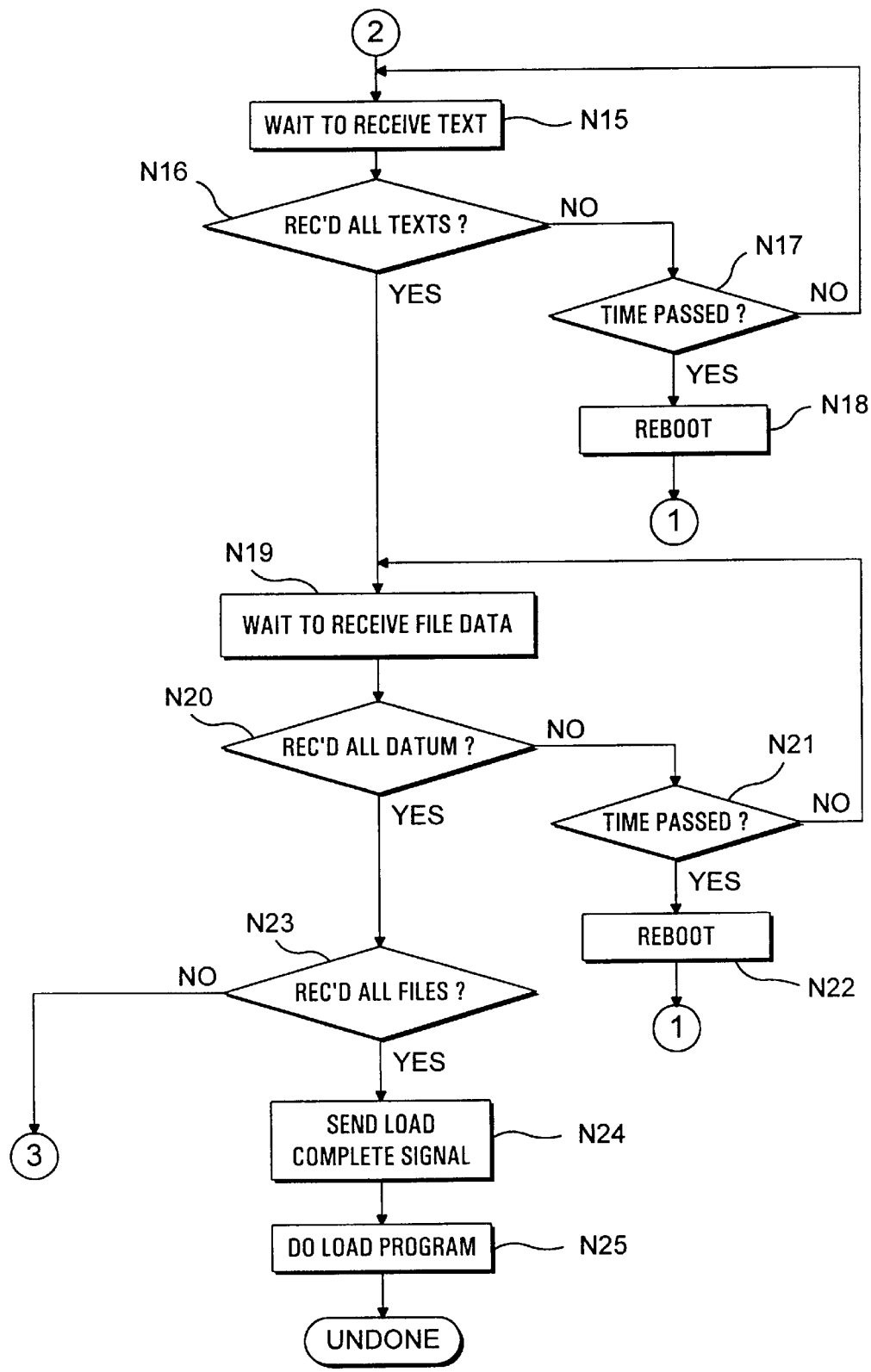
Figure 6:
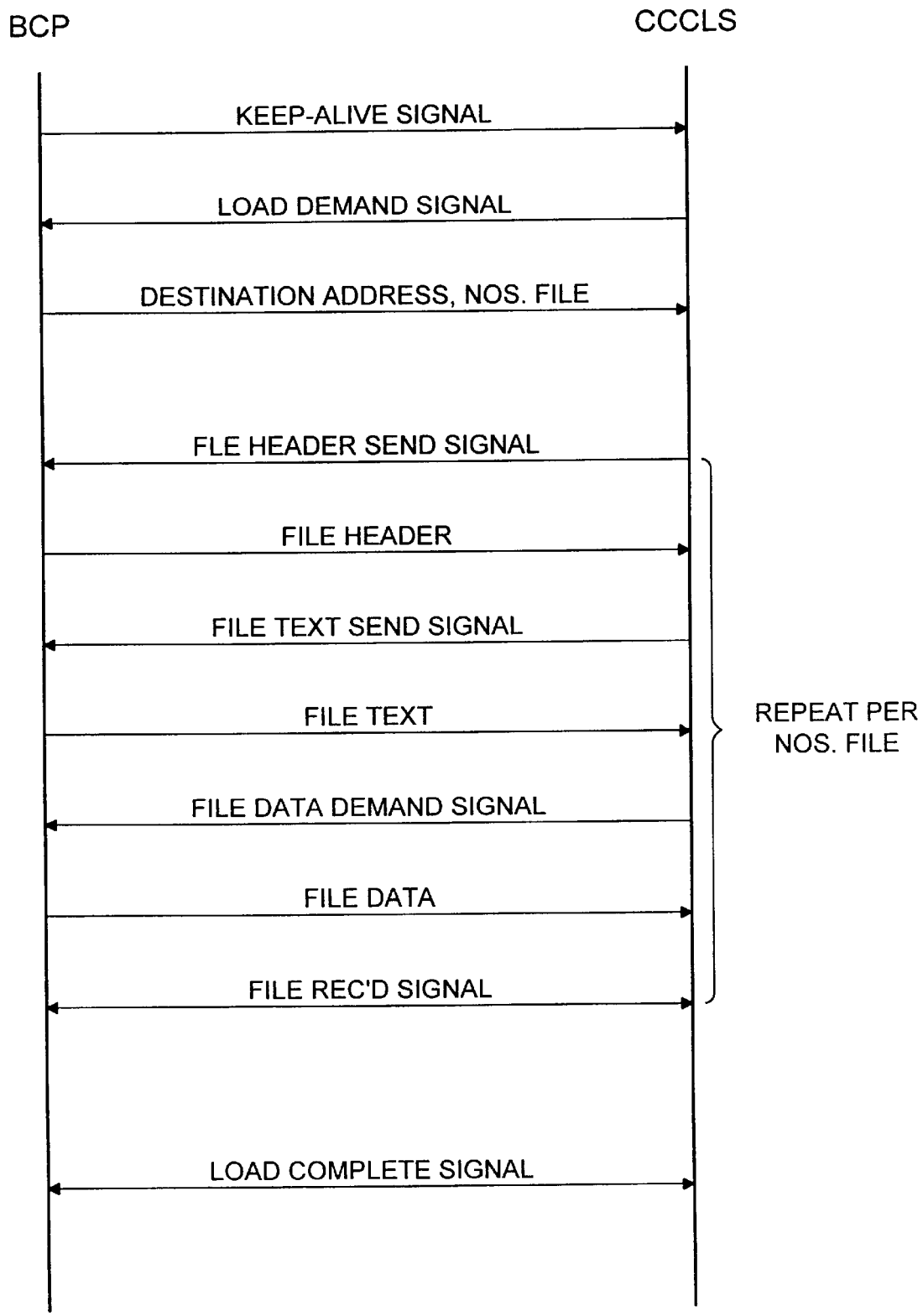
FIG. 6 is a representation of signal flow between main processor and synchronous sub-processor according to the present invention.

All sub-processors under the control of the main processor are designated as CCC, the CCC which needs the loading procedure is designated as CCCL and the CCCL to be selected for synchronization is designated as CCCLS. Further, CCCL except for CCCLS is designated as CCCLN. FIG. 3 illustrates control method of BCP, FIG. 4 illustrates control method of CCCS, and FIG. 5 illustrates control method of CCCL. Further. FIG. 6 is a flow diagram illustrating the signal flow between BCP and CCCS, and FIG. 7 is a flow diagram illustrating the signal flow between BCP and CCCL.

Hereafter, an operation of an embodiment according to the present invention is illustrated referring to FIGS. 3 to 7. Firstly, in operation of BCP referring to a flowchart shown in FIG. 3, BCP transfers a Keep-Alive message through HINA to all CCC sequentially, and waits to receive a Keep-Alive recognition message or Loading demand signal (Step B1, Step B2).

Upon receiving Keep-Alive recognition message, if it needs the loading procedure, each CCC transfers Loading request signal, whereas if not, Keep-Alive recognition message is transmitted to BCP. During the above process, CCC which needs loading implementation indicates that CCC completes initial operation after reset or reboot, while CCC which does not need loading implementation indicates that CCC implementations normal operation upon receiving load file from main processor after completion of initial operation.

BCP receives Keep-Alive recognition message and loading demand signal transmitted from CCC at a predetermined time period, and compares the total amount of received numbers which is an addition to the received numbers of both the Keep-Alive recognition signal and the loading demand signal with the total sending turns of Keep-Alive message (Step B3 to Step B7).

If the added numbers of both the Keep-Alive message and the loading demand signal are the same as the sending turns of Keep-Alive message, no problem at both a signal sending path and a signal receiving path will occur, thereafter implementing the operation for detecting CCCL (Step B10).

If the added numbers of both Keep-Alive message and loading demand signal differ from the sending turns of Keep-Alive message, a problem at either a signal sending path or a signal receiving path or at initial operation of CCC is recognized, thus a signal for rebooting CCC is transmitted to CCC, thereby rebooting the corresponding CCC (Step B8, Step B9). That is, a nonresponsive CCC is detected at an address of CCC receiving Keep-Alive recognition message or loading need signal and thus the corresponding CCC is rebooted. The rebooted CCC is reloaded during an implementation of loading operation in the next turn.

On the other hand, after detecting CCCL during an implementation of Step B10, any one CCC among the detected CCCs is selected in order to designate to CCCLS which is synchronized when loading the file (Step B11). It is preferable to select CCCL which receives the fastest loading demand signal after the transmission of Keep-Alive message. That is for the purpose that a target address is created from the address of CCCL which receives the fastest loading request signal during receiving the other loading demand signal.

After CCCLS is determined by implementing Step B11, broadcasting address is added to the address of CCCLS, thereby becoming a target address (Step B12). The target address is sent to CCCL along with numbers of the files to be loaded, and BCP which transmits both the target address and number of the file waits a file header sending signal to be sent to CCCLS for a predetermined time period (Step B13 to Step B16).

If the sending signal for file header is received within a predetermined time, Step B18 is implemented in which the file header is sent to CCCL, but if not, Step B17 is implemented in which CCCLS is rebooted. In the case of the rebooting of CCCLS, Step B13 and the sequential Steps are resumed after completion of initial operation of the rebooted CCCLS.

On the other hand, after the file header is sent to CCCLS by implementing Step B19, the file header demand signal waits for a predetermined time period(Step B19 to Step B21).

If the file header sending signal is received within a predetermined time period, Step B23 is implemented in which a file text is sent at CCCL, if not, Step B22 is implemented in which CCCLS is rebooted and Step B13 and the sequential Steps are resumed.

Further, after the file text is sent to CCCLS by implementing Step B23, the file header demand signal waits for a predetermined time period(Step B24 to Step B26). If the file data sending signal is received within a predetermined time period, Step B28 is implemented in which file data is sent at CCCL, if not, Step B27 is implemented in which CCCLS is rebooted, and Step B13 and the sequential Steps are resumed.

Furthermore, upon sending the file data to CCCL by implementation of Step B28, the file receiving completion signal waits for a predetermined time period (Step B29 to Step B31). If the file receiving completion signal is received within a predetermined time period, Step B33 is implemented in which it s inquires whether transmission of all files has been completed is implemented, but if not, Step B32 is implemented in which CCCLS is rebooted and Step B13 and the sequential Steps are resumed.

Next, in the execution of Step B33, it is determined whether all files are completely sent. If yes, a load completion signal which is received from each CCCL is stored at a predetermined time period, if not, a signal for requesting the sending of a sequential file header waits for a predetermined time period (Step B34 to Step B36). If the request signal for sending the sequential file header is received within a predetermined time period, Step B18 and the sequential Steps in which the following file header is sent are resumed, if not, Step B37 is implemented in which CCCLS is rebooted, and Step B13 and the sequential Steps are resumed.

After the completion of Step B36 in which load completion signal is received from CCCL at a predetermined time period, a number of the store load completion signals are compared with a number of CCCL. Thus, if the comparison value is same, operation of loading is undone, if the comparison value differs, nonresponsive CCCL is searched to be rebooted (Step 39 to Step 42). The rebooting CCCL is reloaded during an implementation of loading operation in the next turn.

Hereafter, an operation of CCCL is illustrated referring to a flowchart shown in FIG. 4. First, CCCL completes an initial operation upon resetting or restarting, and waits for Keep-Alive message at a predetermined time period (Step S1 to Step S4).

If Keep-Alive message is received within a predetermined time period, Step S6 is executed in which the loading request signal is sent to BCP. If not, Step S5 is executed in which CCCLS is rebooted.

After the completion of sending the load request signal to BCP by executing Step S6, a signal which designates both a destination address and a number of load file to be received from BCP waits at a predetermined time period (Step S7 to Step S9).

If a signal for the destination address and the number of load files is completely received within a predetermined time period, Step S11 is executed in which a signal for sending file header is sent to BCP. If not, Step S10 is executed in which CCCLS is rebooted.

After the completion of sending the File header request signal to BCP by executing Step S11, a File header to be received from BCP waits at a predetermined time period (Step S12 to Step S14).

If a signal for the file header is completely received within a predetermined time period, Step S16 is executed in which a request signal for sending the file text is sent to BCP. If not, Step S15 is executed in which CCCLS is rebooted.

After the completion of sending the file text sending request signal to BCP by executing Step S16, a text file to be received from BCP waits at a predetermined time period (Step S17 to Step S19).

If a signal for the file text is completely received within a predetermined time period, Step S21 is executed in which a request signal for sending the file data is sent to BCP. If not, Step S20 is executed in which the corresponding CCCLS is rebooted.

After the completion of sending the file data request signal to BCP by executing Step S21, file data to be received from BCP waits at a predetermined time period (Step S22 to Step S24).

If a signal for the file data is completely received within a predetermined time period, Step S26 is executed in which a completion signal for receiving the file is sent to BCP. If not, Step S25 is executed in which CCCLS is rebooted.

After the completion of sending the file receiving complete signal to BCP by executing Step 26, an inquiry occurs whether all files to be loaded are completely received. If the receiving of all files is completed, a signal for loading completion is sent to BCP, and Program to be loaded is executed. If not, a signal for requesting the sending of a following file header is sent to BCP, so Step S12 and the sequential Steps are executed (Step S27 to Step S30). Signal flow diagram between BCP and CCCLS is illustrated in FIG. 6.

Hereafter, an operation of CCCLN is illustrated referring to a flowchart shown in FIG. 5. First, CCCLN completes an initial operation upon resetting or restarting, and waits for Keep-Alive message at a predetermined time period (Step N1 to Step N4).

If Keep-Alive message is received within a predetermined time period, Step N6 is executed in which the loading request signal is sent to BCP. If not, Step N5 is executed in which CCCLN is rebooted.

After the completion of sending the loading request signal to BCP by executing Step N6, a signal which designates a destination address and a number of load files to be received from BCP waits at a predetermined time period (Step N7 to Step N9).

If a signal for the destination address and the number of load files is not completely received within a predetermined time period, Step N10 is executed in which CCCLN is rebooted. On the contrary, if a signal for destination address and the number of load files is completely received within a predetermined time period, a receiving completion of file header waits at a predetermined time period (Step N11 to Step N13). If the receiving of the file header does not complete, the corresponding CCCLN is rebooted (Step 14).

After the receiving completion of the file header by executing Step N11 to Step N13, the receiving completion of file header waits at a predetermined time period (Step N15 to Step N17).

If a signal for the file text is completely received within a predetermined time period, Step N19 to Step N21 are executed in which a completion signal for sending the file data waits. If not, Step N22 is executed in which the corresponding CCCLN is rebooted.

If receiving the file data is completed within a predetermined time period by executing Step N19 to Step N21, an inquiring occurs whether all files to be loaded are completely received (Step N23).

If the receiving of all files is completed by the completion of Step N23, a signal of loading completion is sent to BCP and Program to be loaded is executed. If not, Step N11 for receiving header of the consequential file and the sequential Steps are resumed. That is, after the destination address and the numbers of the files are received, each file is received under the synchronization of each CCCLS. Signal flow diagram between BCP and CCCLN is illustrated in FIG. 7.

In the present invention, utilizing Keep-Alive message CCCL is detected at BCP, CCCLS and plural CCCLNs are simultaneously loaded under the synchronization to CCCL which requests the fast loading, by use of broadcasting function. Therefore, a number of communication turns for loading is reduced to decrease the loading time.

If a number of sub-processors is N and a number of files to be loaded is M, for instance, in a conventional art the amount of numbers for communication occurs at the loading of the sub-processors, that is, N times M occurs. However, in the present invention, low occurrence for communication exists, that is, 2N turns which are for identifying a transmission (both sending and receiving) path to the sub-processors and M turns which are for sending M number files.

According to the present invention as described above, since the loading request signal received from sub-processors is collected at a predetermined time period and the sub-processors having the collected signal are simultaneously loaded using broadcasting function, it has the effect for reducing loading time.

What is claimed:

1. A sub-processor loading method in a system which has a plurality of sub-processors connected to a main processor via a repeater and supports a broadcasting function, said method comprising the steps of:

inspecting a transfer path between said main processor and said plural sub-processors;

collecting a loading request signal transmitted from said sub-processors at a predetermined time period; and loading simultaneously said sub-processors using said broadcasting function after interconnecting said main processor to the sub-processors requesting collected loading via said repeater in multipoint-to-point format during said loading object collecting step;

said transfer path inspection and said loading object collecting step are performed according to a Keep-Alive recognition signal generated at the sub-processor in response to a Keep-Alive signal received from said main processor or a loading request signal; and said sub-processor being rebooted when said Keep-Alive signal is not received at a predetermined time period after completion of initial operation.

2. The method according to claim 1, wherein said transfer path inspection step comprises the steps of:

sequentially connecting the sub-processors to the main processor via said repeater; and inspecting whether or not something is wrong with the transfer path.

3. The method according to claim 1, wherein said transfer path inspection step comprises the step of restarting the sub-processor undergoing the inspection if the inspection of transfer path is not completed within the predetermined time period.

4. The method according to claim 1, wherein in said main processor, a periodical execution of a task which receives said Keep-Alive signal sequentially with respect to all said sub-processors under a control of said main processor, and in said sub-processor, when a Keep-Alive message is received, either a Keep-Alive recognition signal for the signal receiving completion or a signal for the load request is sent to said main processor.

5. The method according to claim 1, wherein in said main processor, said Keep-Alive signal is sent to each sub-processor and either said Keep-Alive recognition signal or said load request signal is collected at a predetermined time period, and said sub-processor is rebooted when a number of said subprocessors differ from a total number of said Keep-Alive recognition signals and said load request signals.

6. The method according to claim 5, wherein when said sub-processor is rebooted when a number of said sub-processors differ from a total number of said Keep-Alive recognition signals and said load request signals, a non responsive sub-processor to said signal is selected from an address of said sub-processor which receives either said Keep-Alive recognition signal or said load request signal, only the selected sub-processor is rebooted.

7. The method according to claim 1, wherein main processor of said loading step is loaded in synchronization with any one of the sub-processors which is requested to be loaded when said sub-processor is loaded using a broadcasting function.

8. The method according to claim 7, wherein said synchronized sub-processor is a load requested sub-processor which is received in a first turn.

9. The method according to claim 1, wherein in said sub-processor of said loading step which is requested to be loaded, when a file is loaded from said main processor, said file is loaded in a synchronization of any one of sub-processors selected by said main processor.

10. A sub-processor loading method in a system which has a plurality of sub-processors connected to a main processor via a repeater and supports a broadcasting function, said method comprising the steps of:

inspecting a transfer path between said main processor and said plural sub-processors;

collecting a loading request signal transmitted from said sub-processors at a predetermined time period:

loading simultaneously said sub-processors using said broadcasting function after interconnecting said main processor to the sub-processors requesting collected loading via said repeater in multipoint-to-point format during said loading object collecting step:

wherein said main processor of said loading step being comprised of:

a first step for creating a destination address for loading a file when said sub-processor is loaded using a broadcasting function, sending said destination address to said sub-processor, and loading said file into said destination address;

a second step for waiting during a predetermined time period for a request signal for transmitting a file header received from a synchronized sub-processor after sending said designation address of said first step to said sub-processor, sending said file header to all sub-processors being requested to be loaded when said request signal for transmitting a file header is received within a predetermined time period, and rebooting a synchronized sub-processor when said request signal for transmitting a file header is not received within a predetermined time period a third step for waiting during a predetermined time period for a request signal for transmitting a file text received from a synchronized sub-processors after sending said file header of said second step to said sub-processor, sending said file text to all sub-processor being requested to be loaded when said request signal for transmitting a file text is received within a predetermined time period, and rebooting a synchronized sub-processor when said request signal for transmitting a file text is not received within a predetermined time period;

a fourth step of waiting during a predetermined time period for a request signal for transmitting file data received from a synchronized sub-processor after sending said file text of said third step to said sub-processor, sending said file data to all sub-processors being requested to be loaded when said request signal for transmitting file data is received within a predetermined time period, and rebooting a synchronized sub-processor when said request signal for transmitting file data is not received within a predetermined time period; and a fifth step for waiting during a predetermined time period for a completion signal for receiving a file received from a synchronized sub-processor after sending said file data of said fourth step to said sub-processor, waiting for a request signal for transmitting a sequential file header when said completion signal for receiving said file at a predetermined time period, resuming an operation for receiving said sequential file until all files are completely received, and rebooting a synchronized sub-processor when said completion signal for receiving said file is not received within a predetermined time period.

11. The method according to claim 10, wherein said destination address is adding an address of a synchronized sub-processor to a broadcasting address.

12. The method according to claim 10, wherein a number of files to be loaded is transmitted along with said destination address which is transmitted to said sub-processor.

13. A sub-processor loading method in a system which has a plurality of sub-processors connected to a main processor via a repeater and supports a broadcasting function, said method comprising the steps of:

inspecting a transfer path between said main processor and said plural sub-processors;

collecting a loading request signal transmitted from said sub-processors at a predetermined time period;

loading simultaneously said sub-processors using said broadcasting function after interconnecting said main processor to the sub-processors requesting collected loading via said repeater in multipoint-to-point format during said loading object collecting step; and in said main processor of said loading step, a load completion signal received from said sub-processor being requested to be loaded is collected at a predetermined time period when all files are transmitted to all sub-processors being requested to be loaded using a broadcasting function, a loading operation is undone when number of signals for a loading completion is the same as the numbers of said sub-processors being requested to be loaded, otherwise, said sub-processor is rebooted.

14. The method according to claim 13, wherein when said sub-processor is rebooted when a number of signals for a loading completion is the same as the number of said sub-processors being requested to be loaded, a nonresponsive sub-processor to said load completion signal with respect to an address of said sub-processor which receives said load completion signal is selected, and only said selected sub-processor is rebooted.

15. A sub-processor loading method in a system which has a plurality of sub-processors connected to a main processor via a repeater and supports a broadcasting function, said method comprising the steps of:

inspecting a transfer path between said main processor and said plural sub-processors;

collecting a loading request signal transmitted from said sub-processors at a predetermined time period;

loading simultaneously said sub-processors using said broadcasting function after interconnecting said main processor to the sub-processors requesting collected loading via said repeater in multipoint-to-point format during said loading object collecting step;

in said sub-processor of said loading step which is requested to be loaded, when a file is loaded from said main processors, said file is loaded in a synchronization of any one of sub-processors selected by said main processor; and said synchronized sub-processor is comprised of:

a first step of waiting at a predetermined time period for a signal with respect to said destined address and a number of files to be loaded which are received from said main processor after sending said load request signal to said main processor when said file is loaded using a broadcasting function, sending said request signal for transmitting a file header to said main processor when said destined address and a signal with respect to number of files to be loaded are received within a predetermined time period, and otherwise rebooting said sub-processor when said destined address and a signal with respect to number of files to be loaded are not received within a predetermined time period;

a second step of waiting at a predetermined time period for a file header signal received from said main processor after sending said request signal for transmitting said file header of said first step to said main processor, sending said request signal for transmitting file text to said main processor when said signal for said file header is received within a predetermined time period, and otherwise rebooting said sub-processor when said signal with respect to said file header predetermined time period;

a third step of waiting at a predetermined time period for a request signal for transmitting a file text received from said main processor after sending said file text of said second Step to said sub-processor, sending said request signal for transmitting said file text to main processor when said signal for said file text is completely received within a predetermined time period, and rebooting a synchronized sub-processor when said signal of said file text is not received within a predetermined time period; and a fourth step of waiting at a predetermined time period for a request signal for transmitting file data received from said main processor after sending said request signal for transmitting said file text of said third Step to said main processor, sending said completion signal for receiving said file to said main processor when said signal with respect to said file is completely received within a predetermined time period, and other-wise rebooting a synchronized sub-processor when said signal with respect to said file data is not completely received within a predetermined time period.

16. A sub-processor loading method in a system which has a plurality of sub-processors connected to a main processor via a repeater and supports a broadcasting function, said method comprising the steps of:

inspecting a transfer path between said main processor and said plural sub-processors;

collecting a loading request signal transmitted from said sub-processors at a predetermined time period;

loading simultaneously said sub-processors using said broadcasting function after interconnecting said main processor to the sub-processors requesting collected loading via said repeater in multipoint-to-point format during said loading object collecting step; and in said sub-processor of said loading step which is requested to be loaded, when a file is loaded from said main processor, said file being loaded in a synchronization of any one of sub-processors selected by said main processor; and wherein a sub-processor except for said synchronized sub-processor among all sub-processors being requested to be loaded is comprised of:

a first step of waiting during a predetermined time period for a signal with respect to said destined address and a number of files to be loaded which are received from said main processor after sending said load request signal to said main processor, receiving said file header when said designation address and a signal with respect to number of file to be loaded are received within a predetermined time period, and otherwise rebooting said sub-processor when said destined address and a signal with respect to number of files to be loaded are not received within a predetermined time period;

a second step of waiting during a predetermined time period for receiving said file header when said destined address and a signal with respect to number of files to be loaded are received within a predetermined time period, and otherwise rebooting said sub-processor when said file header is not received within a predetermined time period;

a third step of waiting during a predetermined time period for a signal with respect to said file text received from a main processor when said file header is received after receiving during a predetermined time period said destination address and a signal with respect to number of files to be loaded are received upon completion of said first step, waiting for receiving said file data when said file data is received within a predetermined time period, and otherwise rebooting a corresponding sub-processor when said signal of text file is not completely received within a predetermined time period; and a fourth step of waiting during a predetermined time period for a signal with respect to said file data received from said main processor after receiving said file text of said third Step, waiting for receiving header of following file when said file data is completely received, resuming an operation for receiving said sequential file until all files to be loaded are completely received, and rebooting a corresponding sub-processor when said completion signal for receiving said file data is not received within a predetermined time period.

17. A sub-processor loading method in a system which has a plurality of sub-processors connected to a main processor via a repeater and supports a broadcasting function, said method comprising the steps of:

inspecting a transfer path between said main processor and said plural sub-processors;

collecting a loading request signal transmitted from said sub-processors at a predetermined time period;

loading simultaneously said sub-processors using said broadcasting function after interconnecting said main processor to the sub-processors requesting collected loading via said repeater in multipoint-to-point format during said loading object collecting step; and in said sub-processor of said loading step which is requested to be loaded, when a file is loaded from said main processor, said file is loaded in a synchronization of any one of sub-processors selected by said main processor; and in said sub-processor except for said synchronized sub-processor among all sub-processors being requested to be loaded, an operation for the received file is executed after a load completion signal is sent to said main processor when all files being loaded are received from the main processor at a predetermined time period using a broadcasting function, and otherwise rebooting said sub-processor when all files to be loaded are not completely received from said main processor at a predetermined time period.

18. A sub-processor loading method in a system having a plurality of sub-processors connected with a main processor via a repeater and utilizing a broadcasting function, said method comprising the steps of:

inspecting a transfer path between said main processor and said plural subprocessors;

collecting a loading request signal transmitted from said sub-processors at a predetermined time period;

loading simultaneously said sub-processors using said broadcasting function after interconnecting said sub-processors which request the collected loading during said collection step with said main processor via said repeater in a multipoint base;

said inspection method for said transfer path inspection step and the collect method for said loading object collecting step are performed according to a Keep-Alive recognition signal generated at said sub-processor or in response to a Keep-Alive signal received from said main processor or a loading request signal; and said sub-processor being rebooted when said Keep-Alive signal is not received at a predetermined time period after completion of initial operation.

* * * * *